United States Patent
Watabe (10) Patent No.: US 7,388,478 B2
(45) Date of Patent: Jun. 17, 2008

(54) APPARATUS FOR DETECTING TIRE INFLATION PRESSURE

(75) Inventor: Nobuya Watabe, Nagoya (JP)

(73) Assignee: DENSO CORPORATION, Kariya (JP)

(\*) Notice: Subject to any disclaimer, the term of this patent is extended or adjusted under 35 U.S.C. 154(b) by 146 days.

(21) Appl. No.: 11/113,989

(22) Filed: Apr. 26, 2005

(65) Prior Publication Data

US 2005/0242936 A1   Nov. 3, 2005

(30) Foreign Application Priority Data

Apr. 28, 2004   (JP)   ............................. 2004-133679

(51) Int. Cl.
*B60C 23/02*   (2006.01)
(52) U.S. Cl. ...................... 340/442; 340/443; 340/444; 340/445; 340/447; 340/448; 73/146; 73/146.2; 73/146.5; 116/34 R
(58) Field of Classification Search ................ 340/442, 340/443, 444, 445, 447, 448; 73/146, 146.2, 73/146.5, 146.8; 116/34 R; 701/29, 35
See application file for complete search history.

(56) References Cited

U.S. PATENT DOCUMENTS

| | | | | |
|---|---|---|---|---|
| 5,748,076 A | * | 5/1998 | Horie | ......................... 340/442 |
| 6,408,690 B1 | * | 6/2002 | Young et al. | ............... 73/146.5 |
| 6,720,869 B2 | * | 4/2004 | Watanabe et al. | ........... 340/442 |
| 6,888,446 B2 | * | 5/2005 | Nantz et al. | ................ 340/433 |
| 6,917,285 B2 | * | 7/2005 | Boulot | ........................ 340/442 |
| 7,004,019 B2 | * | 2/2006 | Fischer et al. | ................. 73/146 |

FOREIGN PATENT DOCUMENTS

| | | |
|---|---|---|
| JP | 7-52618 | 2/1995 |
| JP | 7-323708 | 12/1995 |
| JP | 8-297063 | 11/1996 |

\* cited by examiner

*Primary Examiner*—Hung Nguyen
(74) *Attorney, Agent, or Firm*—Posz Law Group, PLC (57) ABSTRACT

A sensor detects values of inflation pressure of a tire of a vehicle one after another. A controller calculates, from the values of the tire inflation pressure, a deflation rate at which the tire is deflating per unit time. When the deflation rate is higher than a first predetermined value, the controller judges that the tire is suddenly punctuated. When the deflation rate is not higher than the first predetermined value but is higher than a second predetermined value, the controller judges that the tire is deteriorated. When the deflation rate is not higher than the second predetermined value, the controller judges that compressed air is naturally leaked from the tire. An alarm unit gives an alarm indicating punctuation or deterioration of the tire or natural air leaking in response to the judgment of the controller.

11 Claims, 5 Drawing Sheets

| | | EXAMPLE | | |
|---|---|---|---|---|
| | | NATURAL AIR LEAKING | AIR LEAKING FROM DETERIORATED TIRE | TIRE PUNCTUATION |
| ALARM LAMP | LIGHTENING PATTERN | FLICKERING (SINGLE PULSE) | FLICKERING (TWO PULSES) | CONTINUOUS LIGHTENING |
| | LIGHTENING COLOR | GREEN | ORANGE COLOR | RED |
| ALARM BUZZER | SOUND | ONE-SHOT SOUND | TWO-SHOTS SOUND | CONTINUOUS SOUND |
| DISPLAY | MESSAGE | ATTENSION ! TIRE INFLATION PRESSURE IS NATURALLY LOWERED | ATTENSION ! AIR LEAKING FROM DETERIORATED TIRE | ATTENSION ! TIRE PUNCTUATION |

FIG. 7

| | | EXAMPLE |
|---|---|---|
| ALARM LAMP | COLOR | COLOR IS CHANGED FROM BLUE (SAFETY) TO RED (CAUTION) AS THE NUMBER Dm OF ASSUMED DAYS IS DECREASED |
| | LIGHTNESS OR DARKNESS | DISPLAY COLOR IS DARKENED AS THE NUMBER Dm OF ASSUMED DAYS IS DECREASED |
| DISPLAY | MESSAGE | MESSAGE INDICATING THE NUMBER Dm OF ASSUMED DAYS IS DIRECTLY DISPLAYED TO URGE DRIVER TO RECHARGE AIR INTO TIRE |

APPARATUS FOR DETECTING TIRE INFLATION PRESSURE

CROSS-REFERENCE TO RELATED APPLICATION

This application is based upon and claims the benefit of priority of the prior Japanese Patent Application 2004-133679 filed on Apr. 28, 2004, so that the contents of which are incorporated herein by reference.

BACKGROUND OF THE INVENTION

1. Field of the Invention

The present invention generally relates to a direct type apparatus for directly detecting tire inflation pressure, and more particularly to an apparatus in which a signal of tire inflation pressure directly detected by a pressure sensor is transmitted from a transmitter attached to a wheel of a tire to a receiver of a vehicle body to specify a cause for the pressure deflation of the tire.

2. Description of Related Art

As one of various types of apparatuses for detecting tire inflation pressure, a direct type has been known. In this type, a transmitter with a sensor such as a pressure sensor or the like is attached to each of wheels of a vehicle, and a receiver with an antenna is disposed in a vehicle body. Each sensor directly detects tire inflation pressure of a tire of the wheel. When the transmitter transmits a detection signal of the tire inflation pressure to the receiver through the antenna, the tire inflation pressure is analyzed in the receiver.

When the analyzed tire inflation pressure is lower than a predetermined threshold value, an alarm lamp is turned on for a driver. Therefore, the driver can know that the tire inflation pressure reaches a low level.

In this apparatus, only one predetermined threshold value is preset. Therefore, regardless of causes of the pressure deflation of a tire, the same alarm is given to the driver.

However, there are actually various causes for lowering tire inflation pressure of a wheel. For example, when a tire is suddenly punctured or blown out, immediate repairing of the tire is needed. When a tire is deteriorated, air of the tire leaks out through the deteriorated rubber of the tire, and tire inflation pressure is gradually lowered. In this case, no immediate repairing of the tire is needed, but the tire must be repaired in the near future. Further, a size of molecules of air is much smaller than that of rubber. Therefore, even tough the rubber is not deteriorated, air of a tire naturally leaks out through the rubber for a long time so as to lower tire inflation pressure very slowly. In this case, no repairing of the tire is needed, but recharging of the air in the tire is needed.

In this specification, the term of "deteriorated tire" indicates a tire in which grooves notched on rubber remain sufficiently deep but the rubber is deteriorated because of the long time passage of the tire from its production so as to cause air leaking from the tire in a degree exceeding the natural air leaking.

Another type of apparatus for detecting tire inflation pressure has been disclosed in Published Japanese Patent First Publication No. H07-323708 (1995). In this apparatus, tire inflation pressure is detected by using a Hall effect element with a magnet, and it is judged whether the pressure deflation of a tire is caused by a puncture of the tire or natural leaking of air. More particularly, a diaphragm is moved in response to a change of air pressure of an air chamber surrounded by a tire and a wheel of the tire, and the magnet is rotated with the movement of the diaphragm so as to change a magnet field. The Hall effect element detects the air pressure in response to the change of the magnet field and outputs a signal indicating tire inflation pressure. When the tire inflation pressure indicated by the signal is lowered to a predetermined threshold value, a change of the tire inflation pressure per unit time is calculated. When the change is larger than a predetermined change value, it is judged that the pressure deflation of a tire is not caused by the natural air leaking but is probably caused by a sudden puncture of the tire, and an alarm is outputted.

However, though the apparatus of the Publication can detect that the pressure deflation of a tire is not caused by natural leaking of air, the apparatus cannot correctly detect other causes. For example, when tire inflation pressure is lowered because of deterioration of a tire, the apparatus erroneously judges that the tire inflation pressure is lowered by a sudden puncture of the tire or natural leaking of air from the tire.

Further, in the apparatus of the Publication, even though tire inflation pressure is gradually lowered for a long time due to natural leaking of air, the apparatus cannot detect the natural leaking of air until the tire inflation pressure is lowered to the predetermined threshold value. In this case, until the tire inflation pressure is lowered to the predetermined threshold value, a driver cannot notice that he drives the vehicle at inadequate fuel economy.

Moreover, in the apparatus using the Hall effect element, tire inflation pressure is not directly detected, but detects air pressure of the air chamber as tire inflation pressure. Therefore, the tire inflation pressure cannot be detected at high precision. Further, when the air pressure of the air chamber is changed for a short time, the movement of the diaphragm does not correctly reflect a change of the tire inflation pressure. Accordingly, this apparatus cannot quickly determine whether the pressure deflation of a tire is caused by a sudden puncture of the tire or natural leaking of air from the tire.

Generally, tire inflation pressure of a wheel is gradually lowered because of natural air leaking. When tire inflation pressure of a wheel is lowered to a specific value, it is difficult for a driver to drive his vehicle safely or at adequate fuel economy. Therefore, it is necessary to inform a driver that tire inflation pressure of his vehicle will reach the specific value in the near future.

SUMMARY OF THE INVENTION

A main object of the present invention is to provide, with due consideration to the drawbacks of the conventional apparatus, a tire inflation pressure detecting apparatus in which a cause for the pressure deflation of a tire is correctly determined even though the tire inflation pressure is not lowered rapidly or very slowly.

A subordinate object of the present invention is to provide a tire inflation pressure detecting apparatus which informs a driver that the tire inflation pressure of his vehicle becomes too low at a specific time to drive his vehicle safely or at adequate fuel economy.

According to a first aspect of this invention, the main object is achieved by the provision of a tire inflation pressure detecting apparatus comprising a detecting unit, a deflation judging unit and an outputting unit. The detecting unit directly detects inflation pressure of a tire and outputs a detection signal indicating the tire inflation pressure. The deflation judging unit determines a degree of deflation in the tire inflation pressure from the detection signal. When the degree of deflation is higher than a first predetermined value, the deflation judging unit judges that the tire has deflated because of a first cause. When the degree of deflation is not higher than the first predetermined value but is higher than a second predetermined value lower than the first predetermined value judges, the deflation judging unit judges that the tire has deflated because of a second cause. When the degree of deflation is not higher than the second predetermined value, the deflation judging unit judges that the tire has deflated because of a third cause. The outputting unit outputs information showing the first, second or third cause when the judgment of the deflation judging unit indicates the first, second or third cause.

According to a second aspect of this invention, the subordinate object is achieved by the provision of a tire inflation pressure detecting apparatus comprising the detecting unit, a deflation time determining unit and an outputting unit. The deflation time determining unit calculates, from the detection signal, a deflation rate at which the tire is deflating per unit time, and determines, from the calculated deflation rate, a specific time, at which the tire inflation pressure becomes lower than a predetermined threshold value, or a specific period of time from a base time to the specific time. The outputting unit outputs information showing the specific time or information showing the specific period of time.

DETAILED DESCRIPTION OF THE PREFERRED EMBODIMENTS

Embodiments of the present invention will now be described with reference to the accompanying drawings, in which like reference numerals indicate like parts, members or elements throughout the specification unless otherwise indicated.

EMBODIMENT 1

According to the first embodiment of this invention, a tire inflation pressure detecting apparatus has a detecting unit, a deflation judging unit and an outputting unit. The detecting unit directly detects inflation pressure of a tire and outputs a detection signal indicating the tire inflation pressure. The deflation judging unit determines a degree of deflation in the tire inflation pressure from the detection signal. When the degree of deflation is higher than a first predetermined value, the deflation judging unit judges that the tire has deflated because of a first cause such as sudden puncture of the tire. When the degree of deflation is not higher than the first predetermined value but is higher than a second predetermined value lower than the first predetermined value judges, the deflation judging unit judges that the tire has deflated because of a second cause such as air leaking based on deterioration of the tire. When the degree of deflation is not higher than the second predetermined value, the deflation judging unit judges that the tire has deflated because of a third cause such as natural air leaking based on non-deterioration of the tire. The outputting unit outputs information showing the first, second or third cause when the judgment of the deflation judging unit indicates the first, second or third cause.

Preferably, the apparatus further has a transmitter controller that transmits the detection signal of the detecting unit to the deflation judging unit every predetermined interval of time. The deflation judging unit obtains the tire inflation pressure every reception of the detection signal and determines the degree of deflation from a difference between the tire inflation pressure currently obtained and the tire inflation pressure obtained previously.

Figure 1:
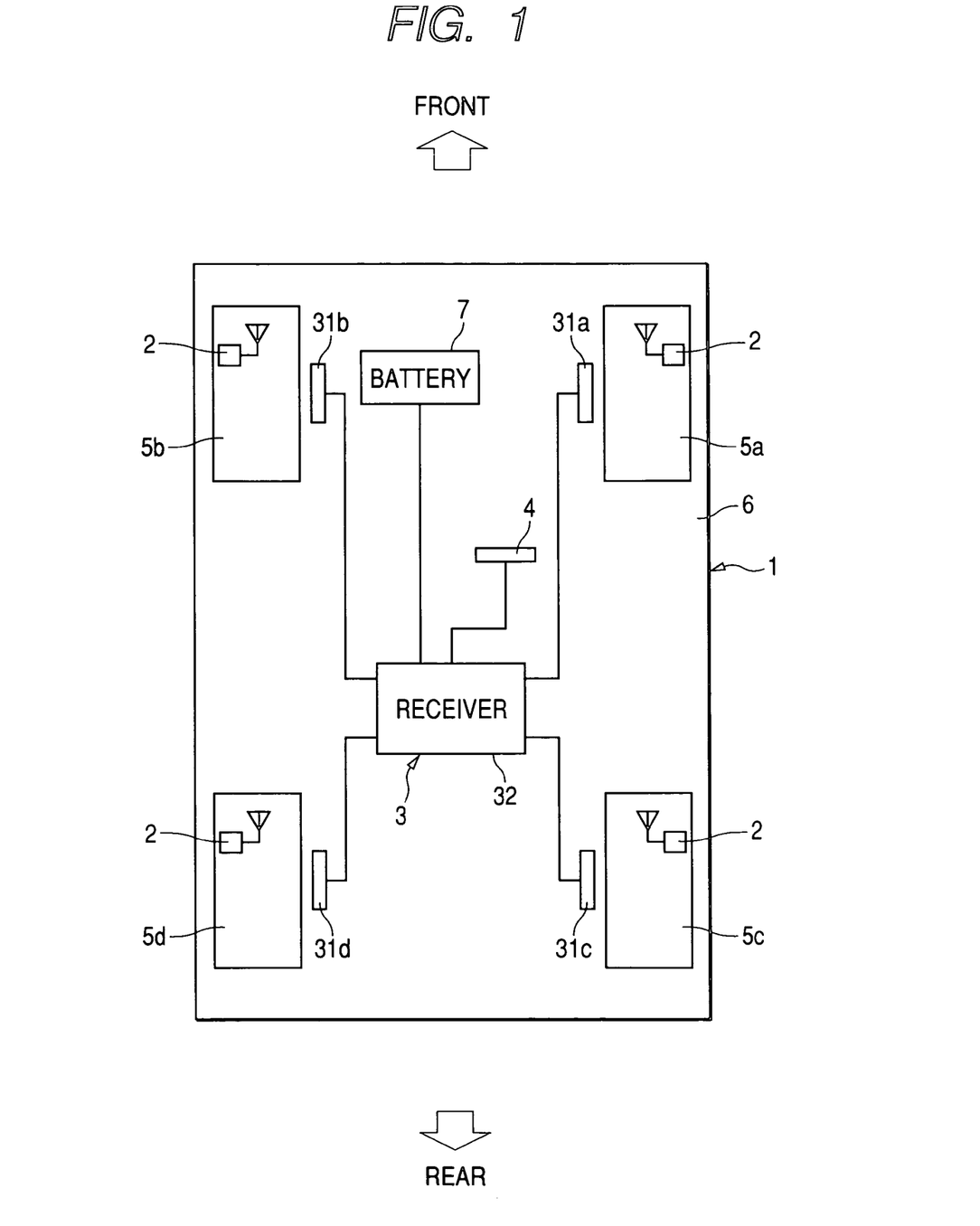
FIG. 1 is a block diagram showing an entire configuration of a tire inflation pressure detecting apparatus according to a first embodiment of this invention.

An example of the apparatus is described with reference to FIG. 1. FIG. 1 is a block diagram showing the entire configuration of a tire inflation pressure detecting apparatus according to a first embodiment of this invention.

As shown in FIG. 1, a tire inflation pressure detecting apparatus is mounted on a vehicle 1. In this drawing, the front of the vehicle 1 is directed upward, and the rear is directed downward. The apparatus has a transmitter 2 attached to each of four wheels 5 (5a, 5b, 5c and 5d) of the vehicle 1, a receiver 3 disposed in a body 6 of the vehicle 1, and an alarming unit 4. The receiver 3 is actuated by receiving electric power from a battery 7.

Figure 2A:
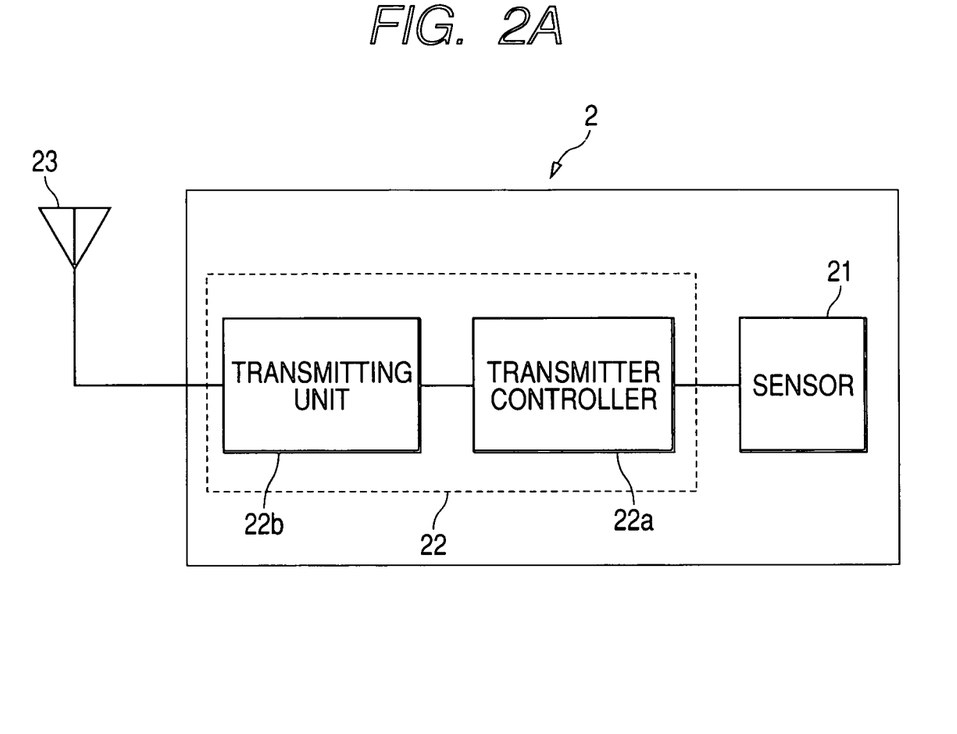
FIG. 2A is a block diagram showing the configuration of each of the transmitters shown in FIG. 1.

FIG. 2A is a block diagram showing the configuration of each transmitter 2.

Each transmitter 2 is attached to an air injection valve (not shown) of the corresponding wheel 5. As shown in FIG. 2A, the transmitter 2 has a sensor 21 functioning as a detecting unit, a microcomputer 22 and an antenna 23. The sensor 21 is made of the combination of a diaphragm type pressure sensor and a temperature sensor and is disposed in the inside (or compressed air) of a tire attached to the wheel 5. Therefore, the sensor 21 can directly detect tire inflation pressure of the wheel 5 and temperature of the compressed air. The sensor 21 outputs detection signals indicating values of the tire inflation pressure and signals indicating values of the temperature one after another to the microcomputer 22.

The microcomputer 22 has a transmitter controller 22a and a transmitting unit 22b. The transmitter controller 22a is composed of a central processing unit (CPU) (not shown), a read only memory (ROM) (not shown) and a random access memory (RAM) (not shown). The transmitting unit 22b has an input/output interface (I/O) (not shown). Each time the microcomputer 22 receives the detection signal of the tire inflation pressure and the temperature signal from the sensor 21 attached to the corresponding wheel 5, the transmitter controller 22a processes the tire inflation pressure according to a program stored in the ROM to obtain detection data indicating a value of tire inflation pressure at a reference temperature, and writes both the detection data and identification (ID) information of the wheel 5 in a transmission frame. The transmission frame is once stored in the RAM. The transmission frame including the detection data and the ID information is sent to the transmitting unit 22b as a detection signal every predetermined interval of time determined by the program. The predetermined interval of time is, e.g., set at one minute. The transmitting unit 22b transmits the detection signal to the receiver 3 through the antenna 23. Therefore, the receiver 3 can receive the detection signals from each of the transmitters 2 of the wheels 5 at predetermined intervals of time.

Figure 2B:
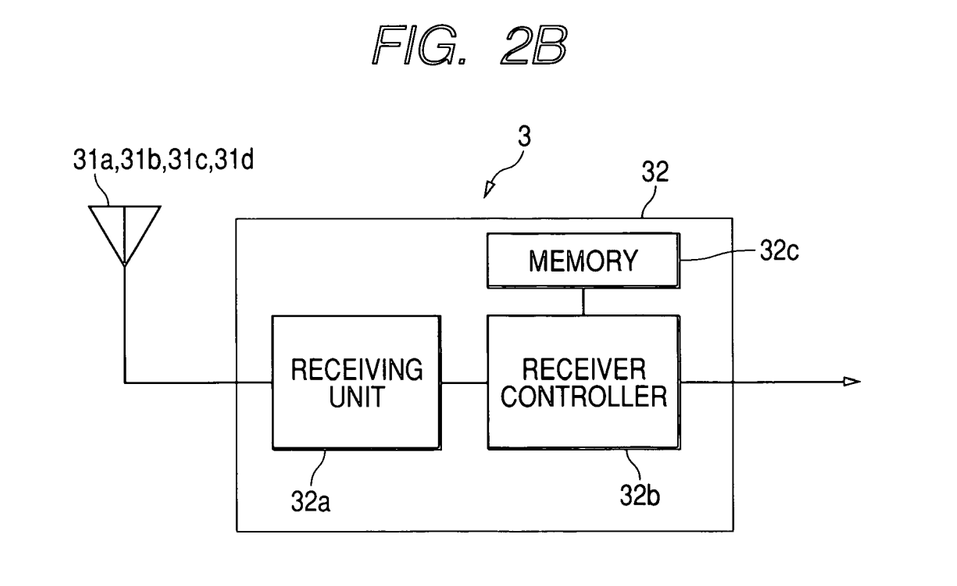
FIG. 2B is a block diagram showing the configuration of a receiver shown in FIG. 1.

FIG. 2B is a block diagram showing the configuration of the receiver 3.

As shown in FIG. 2B, the receiver 3 has a microcomputer 32 and a plurality of (i.e. four) antennas 31 (31a, 31b, 31c and 31d) which receive the detection signals from the transmitters 2 respectively. Each antenna 31 is disposed at a short distance from the transmitter 2 and is fixed in the body 6. The microcomputer 32 has a receiving unit 32a, a receiver controller 32b and a memory 32c. The receiving unit 32a has an I/O (not shown). The receiver controller 32b is composed of a CPU (not shown), an ROM (not shown) and an RAM (not shown). The memory 32c is made of a nonvolatile electrically erasable programmable ROM (EEPROM) (not shown).

The receiving unit 32a receives the detection signals from each transmitter 2 through the corresponding antenna 31 and sends the detection signals to the receiver controller 32b. The controller 32b receiving the detection signals specifies the wheel 5, from which each detection signal is transmitted, based on the ID information of the detection signal. Further, the controller 32b processes the data of the detection signals to obtain tire inflation pressure of each wheel 5 and stores the tire inflation pressure and a current time in the memory 32c for each wheel 5. Moreover, the receiver controller 32b calculates, from values of the tire inflation pressure at different times for each wheel 5, a deflation rate at which a tire is deflating per unit time, when the tire inflation pressure of the wheel 5 becomes lower than a first predetermined threshold value Pt1. Then the controller 32b compares the deflation rate with each of first and second predetermined values, and outputs an alarming signal to the alarming unit 4. The alarming signal indicates one of three causes of the pressure deflation of a tire on the basis of comparison results.

The alarming unit 4 is disposed so as to be visible to a driver. The alarming unit 4 is made of an alarming lamp, an alarming display or the like placed in an instrument panel (not shown) of the vehicle 1. The alarming unit 4 may be made of an alarming buzzer placed so as to be easily audible to the driver. When an alarming signal is transmitted from the receiver 3 to the alarming unit 4, a type of alarm depending on a pressure lowering cause is outputted from the alarming unit 4.

Next, an operation of the tire inflation pressure detecting apparatus is described below.

In each of the transmitters 2, the sensor 2 directly detects a value of inflation pressure of the corresponding tire attached to the wheel 5 at a detection temperature each time a predetermined period of time passes, and outputs a detection signal of the tire inflation pressure and a signal of the temperature. The transmitter controller 22a processes the tire inflation pressure based on the temperature and writes both detection data indicating a value of the detected tire inflation pressure at a reference temperature and ID information of the wheel 5 in a transmission frame, and stores the transmission frame in a memory. The transmitting unit 22b receives the transmission frames one after another from the transmitter controller 22a and transmits each of the transmission frames to the receiver 3 through the antenna 23 as a detection signal every predetermined interval of time.

In the receiver 3, each time the receiving unit 32a receives the detection signal from each of the transmitters 2 through the corresponding antenna 31, the receiver controller 32b processes the received detection signal to extract tire inflation pressure of the corresponding wheel 5 and to determine a cause of the pressure deflation of the corresponding tire from a pressure deflation rate of the corresponding tire.

Figure 3:
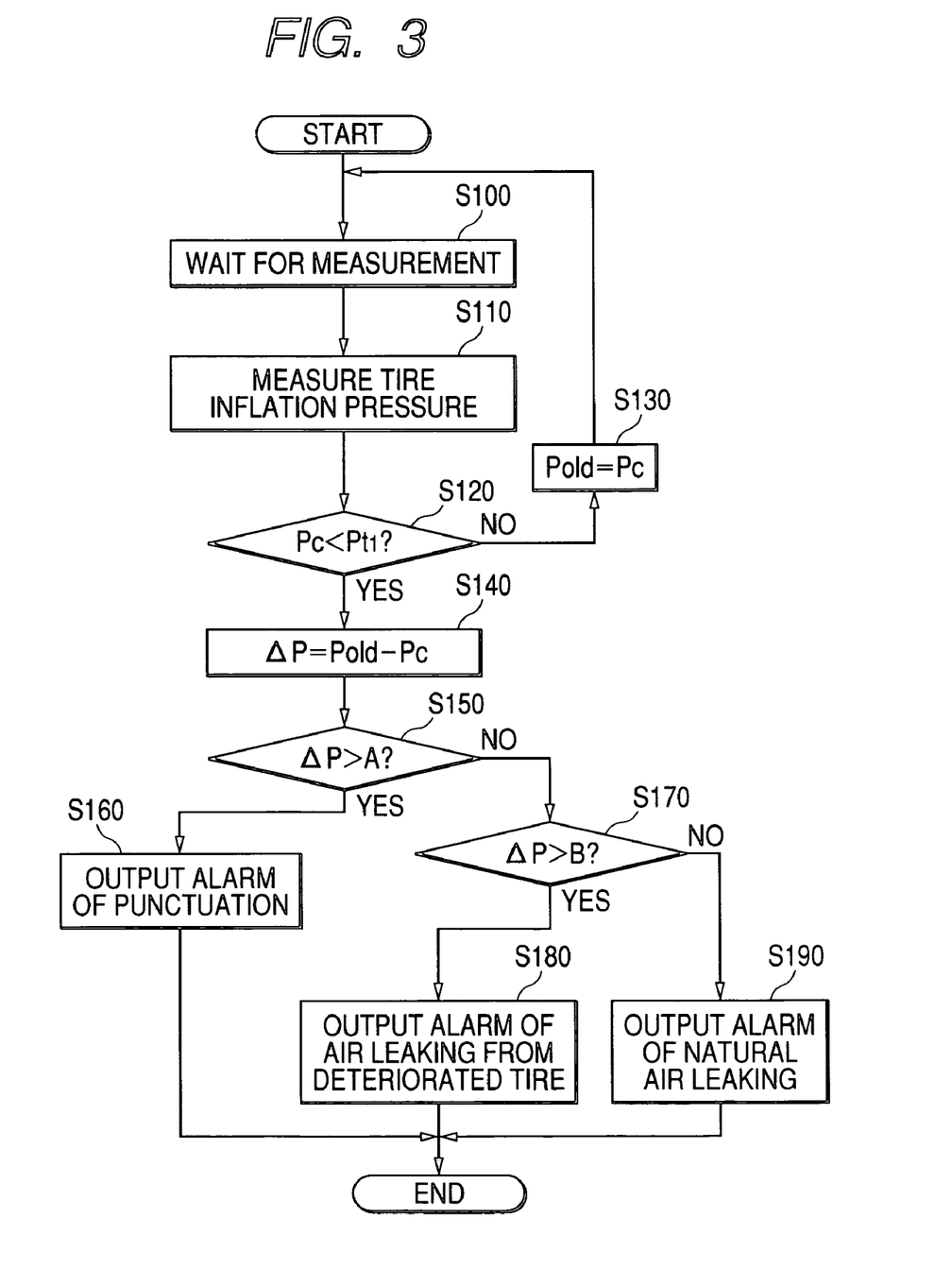
FIG. 3 is a flow chart showing the processing of determining a cause of the pressure deflation of a tire performed by a receiver controller shown in FIG. 1 according to the first embodiment.

FIG. 3 is a flow chart showing the processing of determining a cause of the pressure deflation of a tire performed by the controller 32b according to the first embodiment.

When an ignition switch (not shown) of the vehicle 1 is turned on, electric power of the battery 7 is supplied to the receiver 3 to start the processing of determining a cause of the pressure deflation of each tire.

At step S100, the controller 32b is set at a waiting state to wait for measurement of tire inflation pressure. When the controller 32b receives a detection signal from a transmitter 2 attached to a wheel 5, the controller 32b measures tire inflation pressure from the detection signal at step S110. More particularly, detection data and ID information of the detection signal are analyzed, and tire inflation pressure Pc of the wheel 5 currently detected by a sensor 2 is calculated.

At step S120, the controller 32b judges whether or not an alarming signal is to be outputted. More particularly, the controller 32b judges whether or not the tire inflation pressure Pc is lower than a first predetermined threshold value Pt1. An ordinary-sized motor vehicle is normally set at tire inflation pressure of about 200 kPa, and the first predetermined threshold value Pt1 is set at 140 kPa for the ordinary-sized motor vehicle. A heavy duty truck is normally set at tire inflation pressure of about 800 kPa, and the first predetermined threshold value Pt1 is set at 560 kPa for the heavy duty truck.

In case of negative judgment, the controller 32b concludes that air of a tire of the wheel 5 is compressed at a normal pressure, and a value of tire inflation pressure Pold initially or previously set in the memory 32c is renewed to that of the tire inflation pressure Pc. Then, the procedure returns to the step S100.

In contrast, in case of affirmative judgment at step S120, the controller 32b concludes that the tire of the wheel 5 is unallowably deflating, thereby estimating the cause of the pressure deflation of the tire at step S140 and its subsequent steps.

At step 140, a difference $\Delta P$ ($\Delta P$=Pold-Pc) between the tire inflation pressure Pold stored in the memory 32c and the tire inflation pressure Pc is calculated. When the detection signal is transmitted from the transmitter 2 to the receiver 3 every unit time, the difference $\Delta P$ indicates a deflation rate at which the tire is deflating per unit time. In other cases, the difference $\Delta P$ is adjusted to that per unit time.

At step S150, the controller 32b judges whether or not the tire is punctured. More particularly, the controller 32b judges whether or not the difference $\Delta P$ is larger than a first predetermined value A. The first predetermined value A is set so as to be lower than a deflation rate of a tire obtained when the tire is punctured in a low degree. For example, the first predetermined value A is set at 0.1 Pa/hour (=2.4 kPa/day) for the ordinary-sized motor vehicle and is set at 0.4, kPa/hour (=9.6 kPa/day) for the heavy duty truck.

In case of affirmative judgment the controller 32b concludes that the pressure deflation rate is high and the tire is suddenly punctured. Therefore, at step S160, an alarming signal indicating a sudden puncture of the tire is outputted to the alarming unit 4, and the determination of the cause of the pressure deflation is finished. In case of negative judgment at step S150, the controller 32b judges that the tire is not punctured. Therefore, at step S170, the controller 32b judges whether or not air leaking is caused because of the deterioration of the tire. More particularly, the controller 32b judges whether or not the difference $\Delta P$ is larger than a second predetermined value B set to be lower than the first predetermined value A. The second predetermined value B is set so as to be higher than a pressure deflation rate assumed at natural air leaking and to be lower than a pressure deflation rate assumed at air leaking from a deteriorated tire. For example, the second predetermined value B is set at 0.3 kPa/day for the ordinary-sized motor vehicle and is set at 1.2 kPa/day for the heavy duty truck.

In case of affirmative judgment at step S170, the controller 32b judges that the tire has deflated due to air leaking based on deterioration of the tire. Therefore, at step S180, an alarming signal indicating air leaking from a deteriorated tire is outputted to the alarming unit 4, and the determination of the cause of the pressure deflation is finished. In contrast, in case of negative judgment at step S170, the controller 32b judges that the tire has deflated due to natural air leaking based on non-deterioration of the tire. Therefore, at step S190, an alarming signal indicating natural air leaking is outputted to the alarming unit 4, and the determination of the cause of the pressure deflation is finished.

Figure 4:
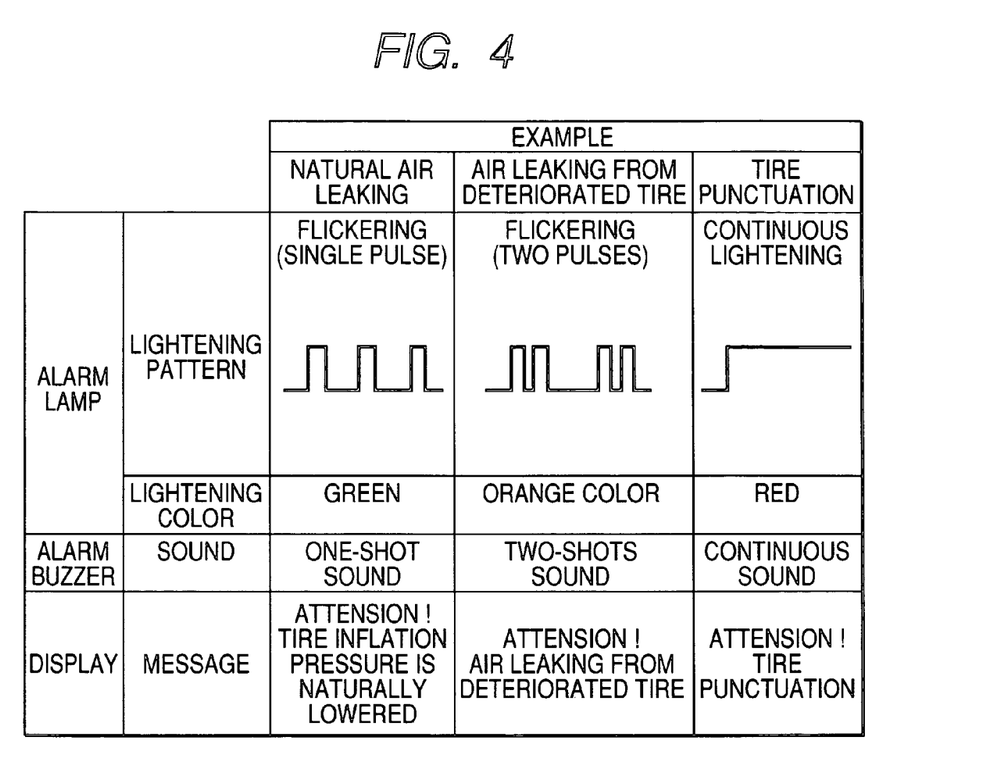
FIG. 4 is a view showing various types of alarms given by an alarming unit shown in FIG. 1 according to the first embodiment.

After the controller 32b determines the cause of the pressure deflation such as puncture, deterioration of tire or natural air leaking, the alarming unit 4 gives an alarm based on the alarming signal. FIG. 4 is a view showing various types alarms given by the alarming unit 4.

As shown in FIG. 4, when an alarm lamp is used as the alarming unit 4, the controller 32b sets a flickering condition which specifies at least one of a lightening period of time, a flickering cycle, a lightening color and a luminous intensity on the basis of the cause of the pressure deflation. The alarm lamp flickers on the flickering condition indicated by the alarming signal. For example, in case of natural air leaking, the flickering cycle is set to be long, and/or the lightening color is set in green representing safety. In case of air leaking from a deteriorated tire, the alarm lamp quickly flickers twice with a comparatively long non-flickering period of time every flickering cycle, and/or the lightening color is set in orange color representing caution. In case of sudden puncture, the alarm lamp is always lightened in red representing a danger state.

When an alarm buzzer is used as the alarming unit 4, the controller 32b sets an alarm sound condition which specifies at least one of a tone of sound, a type of voice, a cycle of sound and strength of sound based on the cause of the pressure deflation. The alarm buzzer gives an alarm sound on the alarm sound condition indicated by the alarming signal. For example, in case of natural air leaking, the alarm buzzer repeatedly gives a one-shot sound with a long mute time. In case of air leaking from a deteriorated tire, the alarm buzzer repeatedly gives a sound of two shots with a short mute time. In case of sudden puncture, the alarm buzzer continuously gives an alarming sound.

When a display is used as the alarming unit 4, the controller 32b sets a display condition which specifies at least one of contents of a message and a display color of a message based on the cause of the pressure deflation. For example, in case of natural air leaking, the display displays warning contents of "Attention! Tire has deflated because of natural air leaking". In case of air leaking from a deteriorated tire, the display displays warning contents of "Attention! Tire has deflated because of deterioration of tire". In case of sudden puncture, the display displays warning contents of "Attention! Tire puncture".

In this embodiment, because the vehicle 1 has four wheels 5, the caution of the pressure deflation is determined for each of the wheels. However, the caution of the pressure deflation for only one of the wheels may be determined.

Further, the detection signal indicates only one value of the tire inflation pressure at a detection time. However, the detection signal may indicate a plurality of values of the tire inflation pressure at detection times.

Moreover, the difference $\Delta P$ between the tire inflation pressure at a current time and that at a time just before the current time is calculated in the controller 32b. However, the difference $\Delta P$ in the tire inflation pressure between arbitrary times may be calculated.

Further more, the detection signals are transmitted one by one from each transmitter 2 to the receiver 3 at predetermined intervals of time. However, the detection signals may be transmitted at different intervals of time.

Still further, the difference $\Delta P$ is calculated from two values of the tire inflation pressure at different detection times. However, the difference $\Delta P$ may be calculated from a difference in level between detection signals without calculating two values of the tire inflation pressure.

As described above, when a pressure deflation rate of a tire of a wheel is higher than the first predetermined value A, the receiver 3 judges that the pressure deflation is caused by sudden puncture of the tire. When the deflation rate is lower than the first predetermined value A and higher than the second predetermined value B, the receiver 3 judges that the pressure reduction of the tire is caused by the deterioration of the tire. When the deflation rate is lower than the second predetermined value B, the receiver 3 judges that the pressure deflation of the fire is caused by natural air leaking of the tire. Accordingly, the apparatus can output an alarm indicating the cause of the pressure deflation such as puncture or deterioration of a tire or natural air leaking from a non-deteriorated tire.

Further, in this embodiment, the sensor 21 is disposed in the inside of each tire to directly detect tire inflation pressure. Accordingly, even though the tire inflation pressure is rapidly changed, the apparatus can correctly and quickly detect a value of the tire inflation pressure.

In this embodiment, one cause is determined from the three causes. However, by comparing a calculated pressure deflation rate with the first and second predetermined values, one cause may be determined from two causes including air leaking based on the deterioration of a tire, or only air leaking based on the deterioration of a tire may be judged.

EMBODIMENT 2

According to the second embodiment of this invention, a tire inflation pressure detecting apparatus has the detecting unit, a deflation time determining unit and an outputting unit. The deflation time determining unit calculates, from the detection signal, a deflation rate at which the tire is deflating per unit time, and determines, from the calculated deflation rate, a specific time, at which the tire inflation pressure becomes lower than a predetermined threshold value, or a specific period of time from a base time to the specific time. The outputting unit outputs information showing the specific time or information showing the specific period of time.

The configuration of the detecting apparatus according to the second embodiment is the same as that according to the first embodiment, and only an operation of the controller 32b differs from that in the first embodiment.

Figure 5:
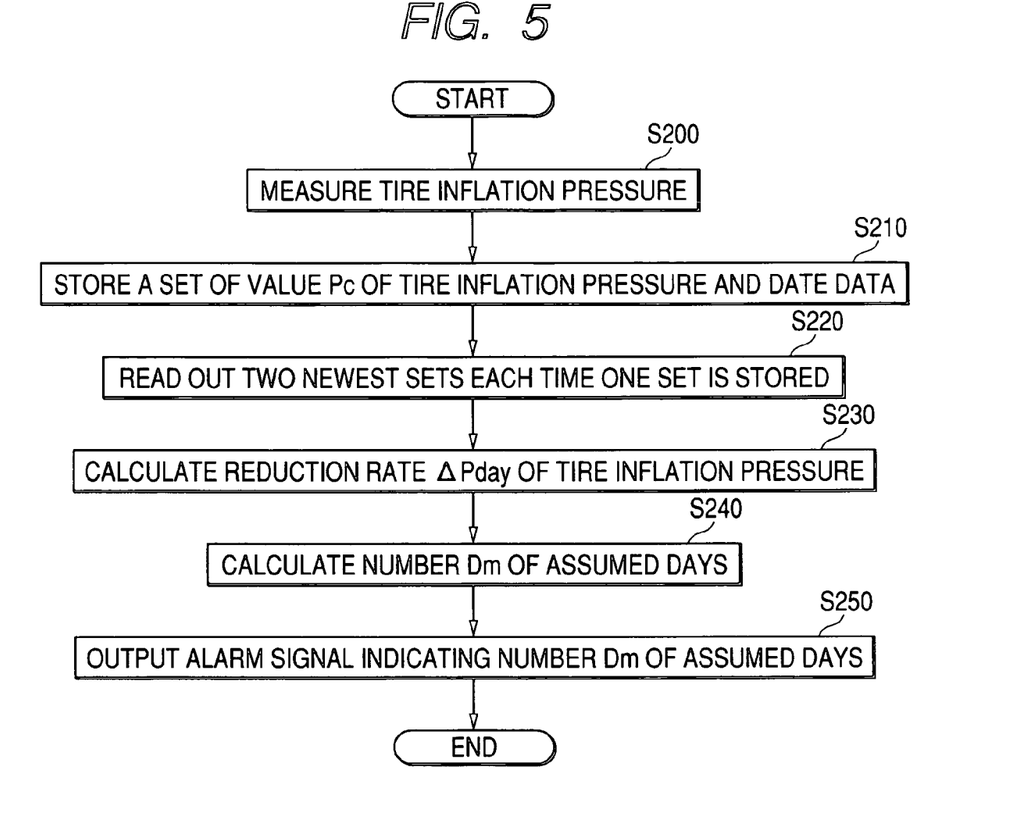
FIG. 5 is a flow chart showing the processing of determining a cause of the pressure deflation of a tire performed by a receiver controller shown in FIG. 1 according to the second embodiment.

An example of the determination of the specific period of time is described with reference to FIG. 5. FIG. 5 is a flow chart showing the processing of determining the specific period of time performed by the receiver controller 32b according to the second embodiment.

When a detection signal (or transmission frame) is transmitted from each of the transmitters 2 to the receiver 3 in response to the turning-on of an ignition switch, the number of assumed days from today to a specific day is calculated according to the second embodiment.

As shown in FIG. 5, at step S200, tire inflation pressure of each of the wheels 5a to 5d is measured, and tire inflation pressure Pi of each wheel 5 currently detected is measured in the same manner as the measurement at steps S100 and S110 of FIG. 3. Generally, when the vehicle 1 starts to run, the temperature of the compressed air of each tire is gradually increased. In this case, the apparatus cannot always correctly measure tire inflation pressure of the wheel 5 as compared with the measurement performed before the running of the vehicle 1. Therefore, in this embodiment, the tire inflation pressure is measured just after the turning-on of the ignition switch and before the running of the vehicle 1.

Figure 6:
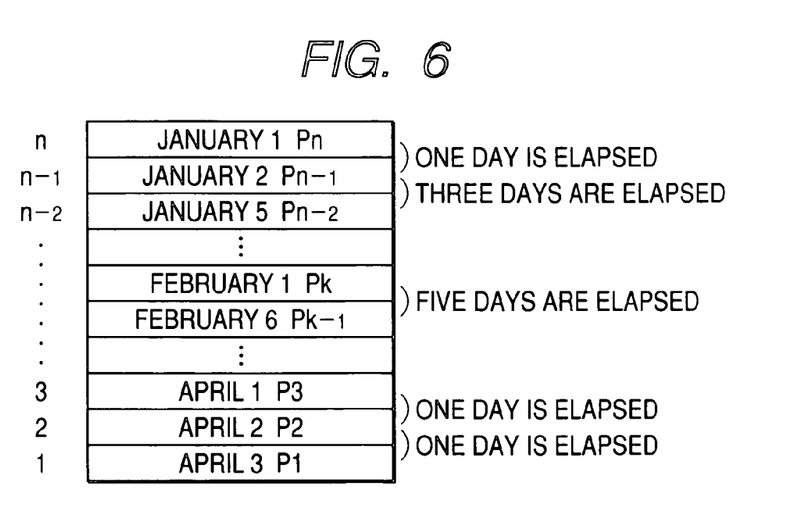
FIG. 6 shows a table of tire inflation pressure and date data stored in a memory shown in FIG. 1 according to the second embodiment.

At step S210, a value Pc of the tire inflation pressure currently measured and date data indicating a date of the measurement of the pressure value Pc are stored in the memory 32c for each wheel 5. FIG. 6 shows a table of tire inflation pressure Pi and date data stored in the memory 32c according to the second embodiment. As shown in FIG. 6, a set of tire inflation pressure Pi (i=1, 2, 3, - - - , k, - - - , n) and date data is stored at the most in the memory 32c per a day. The number of sets of storage data is increased in the memory 32c with time. The value P1 equals to the pressure value Pc currently measured. When air is recharged into a tire of a wheel, or when a driver pushes down a reset switch for a wheel, the data of the memory 32c for the wheel is cleared. In this case, the data of the memory 32c for all wheels may be cleared.

At step S220, each time a set of tire inflation pressure and date data is stored in the memory 32c, the controller 32b reads out two newest sets from the memory 32c for each wheel 5. For example, the controller 32b reads out a first set of pressure value Pi=P2 and date data of "April 2" and a second set of pressure value Pi−1=P1 and date data of "April 3". The number of elapsed days from the date of the first set to the date of the second set is expressed by $\Delta$Day.

At step S230, each time two sets are read out, the controller 32b calculates the number $\Delta$Day of elapsed days and an intermediate pressure deflation rate $\Delta$Piday at which a tire is deflating per day.

$$\Delta Piday = (Pi - Pi-1)/\Delta Day$$

A pressure deflation rate $\Delta$Pday per day is calculated by averaging the intermediate deflation rates $\Delta$Piday currently and previously calculated.

$$\Delta Pday = \Sigma(Pi - Pi-1)/\Delta Day \div (n-1)$$

The symbol n denotes the number of sets stored in the memory 32c, and the summation is executed by summing up (n−1) intermediate deflation rates while changing the variable i from i=2 to i=n.

At step S240, the controller 32b determines a specific day Ds and the number Dm of assumed days from today to the specific day Ds. On the specific day Ds, tire inflation pressure is expected to become lower than a second predetermined threshold value Pt2.

$$Dm = (Pc - Pt2)/\Delta Pday$$

For example, the second predetermined threshold value Pt2 is set at 140 kPa for the ordinary-sized motor vehicle and is set at 560 kPa for the heavy duty truck. The specific day Ds is determined as a date after the number Dm of assumed days from today.

At step S250, the controller 32b prepares an alarm signal indicating the number Dm of assumed days and outputs the alarm signal to the alarming unit 4.

Figure 7:
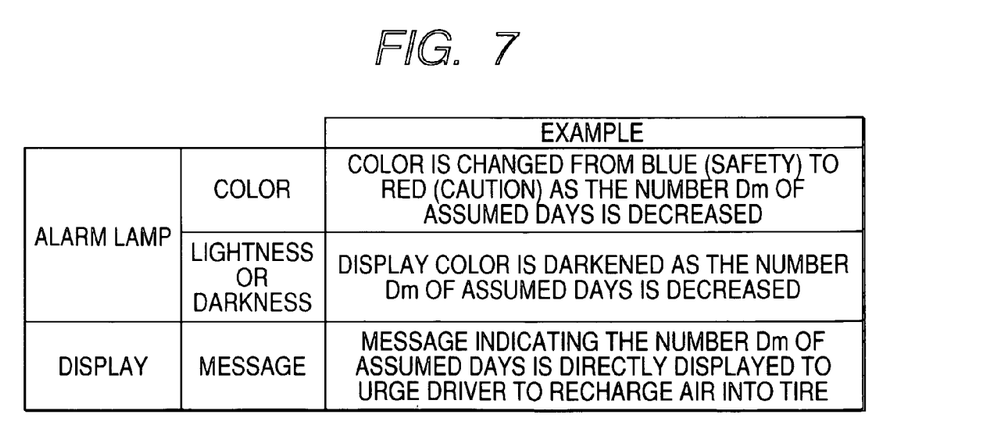
FIG. 7 is a view showing various types alarms given by an alarming unit shown in FIG. 1 according to the second embodiment.

FIG. 7 is a view showing various alarms given by the alarming unit 4. As shown in FIG. 7, when an alarm lamp is used as the alarming unit 4, the controller 32b sets a display condition which specifies a display color changing with the number Dm of assumed days and/or lightness or darkness of the display color such that the display color is darkened as the number Dm of assumed days is decreased. The alarm lamp is lightened on the display condition. For example, as the number Dm of assumed days is decreased, the alarm lamp changes the display color from blue indicating safety to red indicating caution, and/or the alarm lamp darkens the display color such as red.

When a display is used as the alarming unit 4, the controller 32b sets a display condition which specifies contents of a message indicating the number Dm of assumed days. The display 4 displays a message composed of letters on the display condition to directly indicate the number Dm of assumed days and to urge a driver to recharge air into a tire.

As described above, the apparatus determines, from a pressure deflation rate of a tire, the number of assumed days from today to a specific day on which tire inflation pressure is expected to become lower than the second predetermined threshold value, and outputs the number of assumed days. Accordingly, a driver can notice the number of assumed days and recharge air into a tire until the specific day to drive his vehicle safely or at adequate fuel economy.

In this embodiment, the controller 32b determines the number of assumed days. However, the controller 32b may determine the specific day to urge the alarming unit 4 to give information of the specific day. Further, a deflation rate $\Delta$Pday at which a tire is deflating per day is calculated. However, a deflation rate per arbitrary unit time may be calculated. Further, the deflation rate $\Delta$Pday is set at an average of a plurality of intermediate deflation rates. However, an intermediate deflation rate calculated from two newest pressure values P1 and P2 may be set as the deflation rate $\Delta$Pday. Further, the memory 32c stores date data. However, the memory 32c may store the number of elapsed days starting from the oldest date of the stored data.

Moreover, in this embodiment, it is assumed that tire inflation pressure is lowered because of natural air leaking. However, tire inflation pressure is sometimes lowered because of deterioration or puncture of a tire. In this case, after the occurrence of deterioration or puncture of a tire, a pressure deflation rate of the tire becomes higher than that at days before the occurrence. Therefore, it is preferred that a pressure deflation rate $\Delta$Pday of the tire is calculated from pressure values of two newest days.

Furthermore, it is preferred that the determination of the specific period of time in the second embodiment is combined with the determination of the cause of the pressure deflation in the first embodiment. More particularly, in this combination, the operations at steps S210 to S250 in the second embodiment are performed after that at step S110 and before those at steps S120 to S190. Accordingly, a driver can notice tire puncture deterioration of tire or natural air leaking in addition to the number Dm of assumed days.

What is claimed is:

1. An apparatus comprising:
a detecting unit, disposed in an inside of a tire, that is configured to directly detect an inflation pressure of the tire and outputs a detection signal indicating the tire inflation pressure;
a deflation time determining unit that is configured to:
set a predetermined threshold value lower than a normal inflation pressure of the tire such that the inflation pressure of the tire reaching the predetermined threshold value indicates deflation of the tire;
calculate, from the detection signal outputted from the detecting unit, a deflation rate, at which the tire is deflating per unit time, when the inflation pressure detected in the detecting unit is higher than the predetermined threshold value, and
determine, from the calculated deflation rate, a specific time, at which the tire inflation pressure becomes lower than the predetermined threshold value when the inflation pressure detected in the detecting unit is higher than the predetermined threshold value, or a specific period of time from a base time to the specific time; and
an outputting unit that is configured to output information showing the specific time or information showing the specific period of time.

2. The apparatus according to claim 1, further comprising:
a transmitter controller that is configured to transmit the detection signal outputted from the detecting unit to the deflation time determining unit every predetermined interval of time, and
a storing unit which stores a set of the tire inflation pressure indicated by the detection signal and time data indicating a reception time of the detection signal each time the deflation time determining unit receives the detection signal,
wherein the deflation time determining unit is configured to read out the set currently stored and another set previously stored from the storing unit, calculate a pressure difference between values of the tire inflation pressure of the two sets, calculate a time difference between the reception times of the two sets, and calculate the deflation rate from the pressure difference and the time difference.

3. The apparatus according to claim 1, further comprising:
a transmitter controller that is configured to transmit the detection signal, detected by the detecting unit before running of a vehicle with the tire, to the deflation time determining unit.

4. The apparatus according to claim 1, further comprising a condition setting unit that is configured to set, based on the specific time or the specific period of time determined by the deflation judging unit, a display condition which specifies a display color changing with the specific time or the specific period of time, wherein the outputting unit comprises an alarm lamp which is arranged to be lightened on the display condition.

5. The apparatus according to claim 1, further comprising a condition setting unit that is configured to set, based on the specific period of time determined by the deflation judging unit, a display condition which specifies lightness or darkness of a display color such that the display color is darkened as the specific period of time is decreased, wherein the outputting unit comprises an alarm lamp which is arranged to be lightened on the display condition.

6. The apparatus according to claim 1, further comprising a condition setting unit that is configured to set, based an the specific time or the specific period of time determined by the deflation judging unit, a display condition which specifies contents of a message indicating the specific time or the specific period of time, wherein the outputting unit comprises a display which is arranged to display the message on the display condition.

7. The apparatus according to claim 1, wherein the detecting unit is disposed in a compressed air of the tire to directly detect a pressure of the compressed air as the tire inflation pressure.

8. The apparatus according to claim 1, wherein the detecting unit is configured to directly detect an absolute pressure of a compressed air of the tire as the tire inflation pressure.

9. The apparatus according to claim 1, wherein the detecting unit is disposed in the inside of each of all tires of a vehicle, and the detecting unit corresponding to each tire is configured to detect the inflation pressure of the each tire, independent of the inflation pressures of the other tires.

10. The apparatus according to claim 1, wherein the detecting unit detects the inflation pressure of the tire before a vehicle having the tire starts running.

11. The apparatus according to claim 1, wherein the predetermined threshold represents a value when the normal inflation pressure begins to change to deflating.

* * * * *